May 1, 1956
R. B. RANSOM
2,743,792
ROTARY MOTION RESISTING DEVICE
Filed Oct. 11, 1951
2 Sheets-Sheet 2
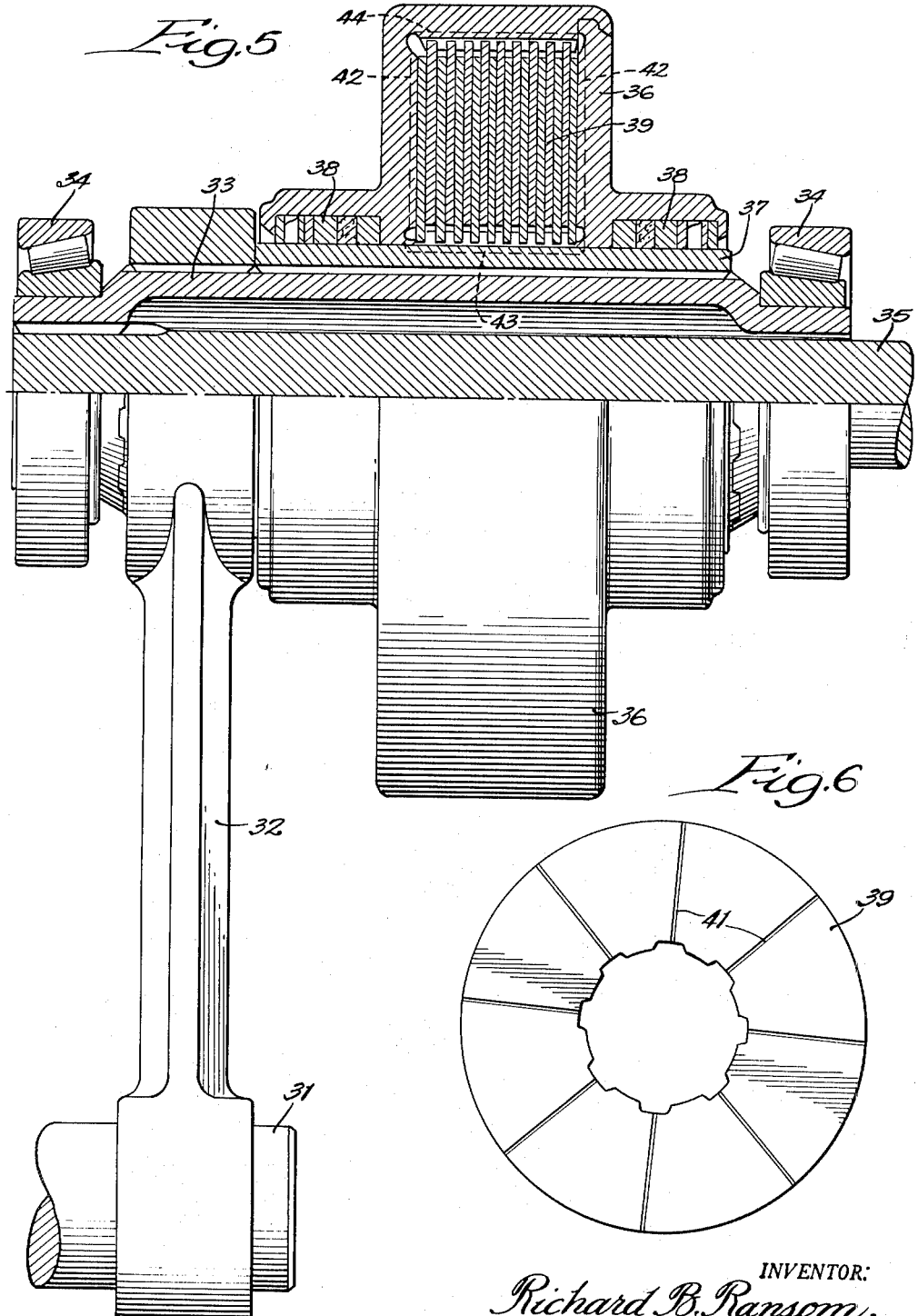
INVENTOR:
Richard B. Ransom,
BY
E. J. Borth,
ATTORNEY.

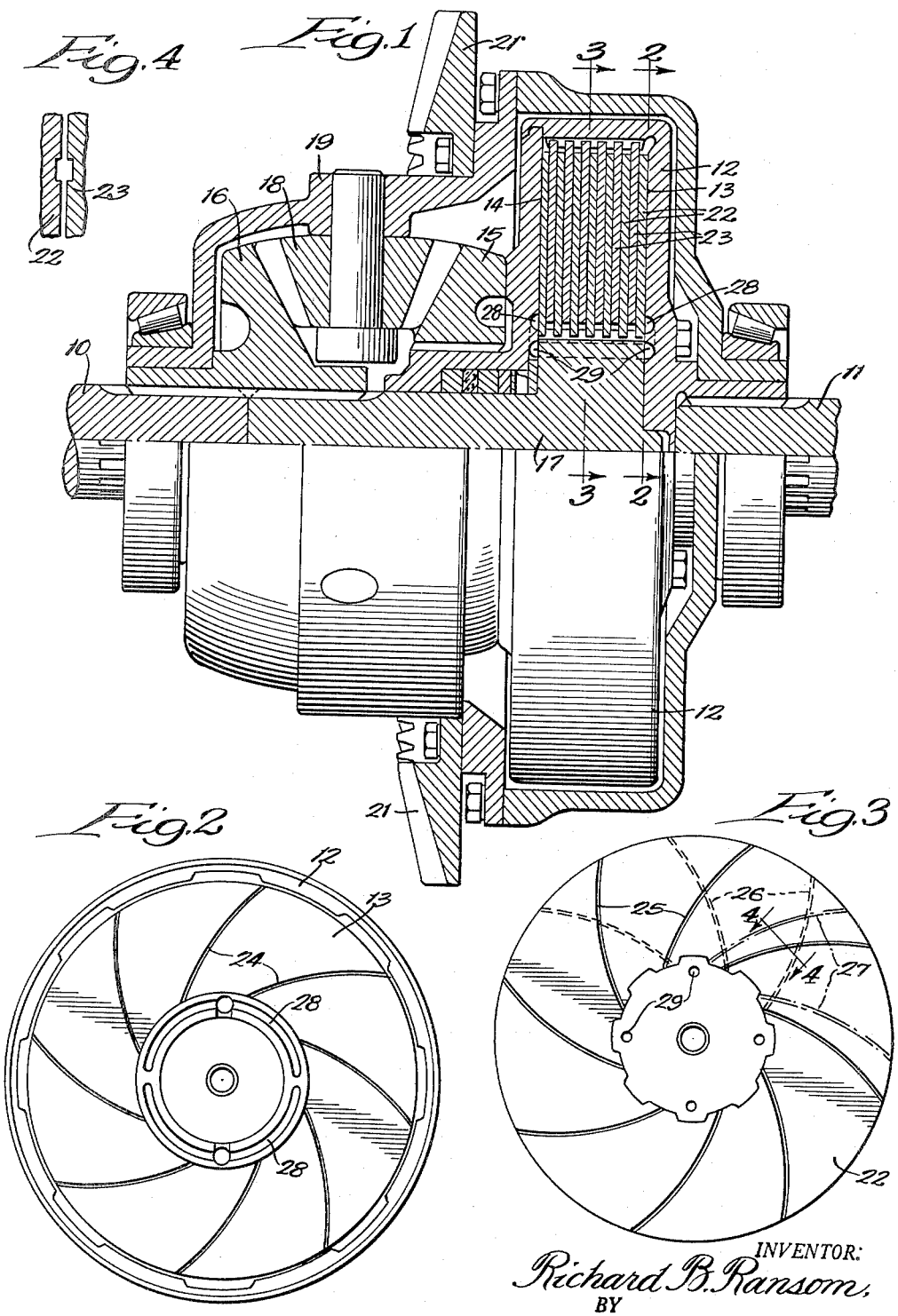

United States Patent Office 2,743,792
Patented May 1, 1956

2,743,792

ROTARY MOTION RESISTING DEVICE

Richard B. Ransom, South Bend, Ind.

Application October 11, 1951, Serial No. 250,917

8 Claims. (Cl. 188—90)

This invention relates to rotary motion resisting devices and more particularly to a fluid operated device which will yieldingly resist rotary motion between relatively rotatable parts.

Devices for resisting rotary motion as heretofore constructed have generally relied either on mechanical friction or on pumping of a liquid through a restricted orifice to produce yielding resistance to movement. Mechanical friction devices are subject to wear and are extremely difficult to maintain in proper adjustment. Fluid pumping devices involve orifices whose size is very critical and which are subject to clogging by foreign material and further require parts fitting extremely accurately to avoid leakage.

According to one object of the present invention a rotary motion resisting device is provided in which the use of mechanical friction or of fluid flow through orifices is avoided.

Another object is to provide a motion resisting device in which yielding resistance to relative motion is provided by shearing a liquid film between adjacent relatively rotatable surfaces and in which the surfaces are formed to produce a circulation of the liquid in the film for cooling.

According to one feature of the invention circulation is produced by vanes or grooves on the faces of the discs which cross each other so that upon relative rotation of the discs the liquid film will be given a tendency to flow.

According to another feature liquid flow passages are provided connecting the opposite ends of the unit so that continuous circulation of liquid can occur upon extensive rotation in one direction.

A further object of the invention is to provide a combined gear and motion resisting unit to drive a plurality of shafts for controlled relative rotation.

The above and other objects and features of the invention will be more readily apparent from the following description when read in connection with the accompanying drawings, in which:

Figure 1 is an axial section with parts in elevation of a combined gear and motion resisting unit embodying the invention;

Figure 2 is a section on the line 2—2 of Figure 1;

Figure 3 is a section on the line 3—3 of Figure 1;

Figure 4 is a partial enlarged section on the line 4—4 of Figure 3;

Figure 5 is a view similar to Figure 1 of an alternative construction, and

Figure 6 is a face view of one of the discs of Figure 5.

The combined unit as shown in Figure 1 is adapted to connect a pair of co-axial shafts 10 and 11 for controlled relative rotation as, for example, in a differential axle mechanism. The shaft 11 is splined or keyed to a housing 12 which is formed with a cylindrical internal cavity having flat ends 13 and 14. The housing is rigidly splined or keyed to a bevel gear 15 forming a part of the gear unit. The shaft 10 has splined or keyed thereto a similar bevel gear 16 and is further connected to a hub 17 lying within the housing 12. The two gears 15 and 16 mesh with pinions 18 which are rotatably supported on an outer rotatable casing 19. The casing 19 carries a bevel gear 21 through which it is driven.

Within the housing 12 there is assembled a series of annular discs comprising inner discs 22 which are splined to the hub 17, and outer discs 23 which are splined to the housing 12. The inner discs 22 terminate short of the housing as shown, to leave fluid flow passages around their outer edges and the outer discs 23 terminate short of the hub to leave fluid flow passages around their inner edges. The discs are positioned in the housing so that there will be a slight clearance between their faces and between the faces of the end discs and the inner ends 13 and 14 of the housing cavity which is preferably on the order of .004 to .010 inch.

In order to impose a yielding resistance to relative movement between the hub and housing, the housing is filled or substantially filled with a liquid which will wet the surfaces of the discs and which preferably has a relatively high viscosity. Liquids suitable for this purpose are silicone oil, glycols or glycerine, or heavy petroleum oils. The material from which the discs are made is selected so that the liquid used will wet the disc surfaces. Where a petroleum oil and glycerine or a glycol is used, ordinary steel discs may be employed. However, when a silicone oil is used, the discs are preferably plated or coated with chromium, zinc, cadmium or the like to increase their wetability. With this construction and with the disc surfaces slightly spaced, a film of liquid will form between the disc surfaces and will be sheared when the discs turn relative to each other to impose a resistance to such relative turning.

In order to cause the liquid in the film to circulate so that all of the liquid will eventually contact the outer housing surface and will be cooled, the disc surfaces are formed with vanes or grooves as best seen in Figs. 2 and 3. As shown in Figure 2 the ends of the housing are grooved with relatively thin narrow grooves 24 which spiral outward from the central portion of the housing ends and which lie at all points in their length at acute angles to radii through them. The discs themselves are formed with similar grooves 25 on their faces as seen in full lines in Figure 3. The grooves on the opposite faces of each disc angle in opposite directions, the grooves on the back surface of the disc shown in Figure 3 being indicated by the dotted lines 26 as crossing the grooves 25. When the discs are assembled they are assembled in such a manner that the grooves on adjacent disc faces also cross each other, the grooves on the next adjacent disc which face the grooves 26 angling in the same direction as the grooves 25 as indicated by the dot-dash lines 27 so that they will cross the grooves 26. Similarly the grooves on the outermost faces of the end discs will cross the grooves on the inner faces of the housing cabinet.

It will be appreciated that the discs engage over their entire surfaces with a close clearance between the opposed surfaces except where the grooves are cut into the surfaces. Within these vanes or grooves, which have a depth of the order of .030" to .040", the viscosity of the liquid and the much greater resistance to shear of the thinner film of liquid between the un-grooved surface of the discs on either side of each groove produces a strong pumping action to circulate the liquid through the grooves, and to take up liquid from between the ungrooved surfaces and replace it with non-sheared liquid from the vanes.

When the discs turn relative to each other the grooves or vanes thus produce a strong pumping action and replenish the film of liquid which is exposed to the stronger shearing action. As a result of this pumping action, the liquid will flow around the outer edges of the inner discs 22 and the inner edges of the outer discs 23 and will eventually reach the inner edges of the surfaces between the outermost discs 22 and the housing ends. At this point the liquid is picked up by grooves 28 formed in the housing end surfaces and is conducted to cross bores 29 in the hub so that it can flow from one end of the unit to the other. Thus in the event of any continued relative rotation in the same direction the liquid can flow in a closed circuit through the spaces between all of the discs in series and can return through the grooves 28 and the passages 29. It will be noted that since all of the spaces between the discs are filled, the centrifugal heads on the liquid will balance so that only a relatively small pumping force is required to circulate the liquid. In this way all of the liquid will be maintained in circulation and will be cooled during operation of the unit.

In the combined unit of Figure 1, as the driving gear 21 is turned it moves the pinions 18 around bodily and exerts an equal turning force on each of the gears 15 and 16. Thus it serves to turn the two shafts 10 and 11 equally. If there is a difference in resistance in the turning of the shafts, the shaft having the greatest resistance tends to remain stationary while the other shaft turns at double the speed. As soon as this occurs relative rotation is produced between the housing 12 and the hub 17 which is resisted by shearing of the liquid film between the surfaces of the discs. Therefore even though one of the shafts can turn freely so far as external load is concerned, which would result in no driving force on the other shaft, the resistance unit will oppose a resistance to relative rotation so that the loaded shaft will still be driven.

Another application of the resistance unit is illustrated in Figure 5 as applied to a shock absorber for a vehicle wheel suspension. As shown in this figure the wheel may be carried by an axle 31 which is carried by a pivoted arm 32. The arm is supported on a sleeve or hub 33 mounted in bearings 34 and the normal vehicle load is carried by a torsion rod 35 extending through the sleeve 33 and secured thereto at one end. As the load on the wheel varies, the rod 35 will flex in torsion allowing the sleeve 33 to turn and the axle 31 to move vertically.

This motion is resisted by a disc unit similar to that of Figure 1 and which comprises a housing 36 fixedly secured on the vehicle frame. The housing 36 fits around the sleeve 33 and seals against a sleeve 37 which is splined to the sleeve 33. Packings 38 of the type more particularly disclosed and claimed in my co-pending application Serial No. 250,915, filed October 11, 1951, and now abandoned, seal the housing against the sleeve 33 to prevent any loss of liquid from the housing.

A series of discs 39 are mounted in the housing and are alternately splined to the housing and the sleeve 37. Since this type of unit does not involve any substantial amount of rotation in one direction but rather a relatively limited oscillating movement, it is desirable to produce an outward radial movement of the liquid between all of the disc surfaces regardless of the direction of relative rotation. For this purpose the disc surfaces are formed with radially extending vanes or grooves 41 as best seen in Figure 6 and the end faces of the housing are formed with deeper grooves or passages 42. The sleeve 37 is formed with axially extending grooves or passages 43 connecting the inner edges of all of the discs and communicating with the passages 42 and the housing is formed with similar grooves or passages 44 connecting the outer edges of the discs and communicating with the passages 42.

Upon relative rotation of the parts in either direction the vanes or grooves 41 will cause an outward flow of liquid between the disc surfaces into the passages 44. The liquid will flow radially inward through the passages 42 into the passages 43 and again outward between the discs.

In this unit as the arm 32 tends to swing it will turn the sleeve 37 relative to the housing 36 and will cause relative rotation of the discs 39. This movement is yieldingly resisted by the liquid film between the discs in the same manner as in the unit of Figure 1 so that motion of the axle and wheel will be damped.

In both units the motion resisting or damping effect is due solely to shearing of the liquid film between the adjacent spaced surfaces which is proportional to the rate of motion and the liquid viscosity and inversely proportional to the clearance. Since viscosity and clearance do not change appreciably, especially when a relatively constant viscosity liquid such as silicone oil is used, the resisting effect is directly proportional to the rate of motion for practical purposes. This enables the device to operate efficiently over a wide range of conditions and gives it especially desirable shock absorber characteristics to damp spring oscillations.

While two embodiments of the invention have been shown and described in detail, it will be understood that these are illustrative only and are not intended to indicate the scope of the invention, reference being had for this purpose to the appended claims.

What is claimed is:

1. A rotary motion resisting device comprising a series of discs arranged in spaced face to face relationship, means interconnecting alternate ones of the discs for rotation together, means connecting the remaining discs for rotation together, grooves lying at an angle to radii therethrough on the faces of the discs with the grooves on adjacent faces of adjacent discs angling in opposite directions, and a liquid which will wet the surfaces of the discs filling the spaces between them to transmit torque between the discs.

2. A rotary motion resisting device comprising inner and outer coaxial members, relative rotation of which is to be resisted, a first set of discs secured to the inner member and terminating short of the outer member to leave fluid passages around their outer edges, a second set of discs alternating with and spaced from the first set secured to the outer member and terminating short of the inner member to leave fluid passages around their inner edges, grooves on the faces of the discs lying at angles to radii therethrough with the grooves on the opposite faces of each disc angling in opposite directions and the grooves on adjacent faces of adjacent discs crossing each other, and a liquid which will wet the faces of the discs filling the spaces between them to transmit torque between the discs.

3. A rotary motion resisting device comprising inner and outer coaxial members, relative rotation of which is to be resisted, a first set of discs secured to the inner member and terminating short of the outer member to leave fluid passages around their outer edges, a second set of discs alternating with and spaced from the first set secured to the outer member and terminating short of the inner member to leave fluid passages around their inner edges, grooves on the faces of the discs lying at angles to radii therethrough with the grooves on the opposite faces of each disc angling in opposite directions and the grooves on adjacent faces of adjacent discs crossing each other, means forming a fluid passage connecting the outer faces of the outermost discs, and a liquid which will wet the faces of the discs filling the spaces between the discs and the fluid passages to transmit torque between the discs.

4. A rotary motion resisting device comprising inner and outer coaxial members relative rotation of which is to be resisted, a plurality of flat discs between the members alternate ones of which are connected in axially fixed relationship to turn with the outer member and the remaining ones of which are connected to turn with the inner member, radially extending straight grooves on the faces of the discs, the members being formed with passages connecting the inner and outer edges of the discs, and a liquid which will wet the surfaces of the discs filling the spaces between the discs and the passages said grooves acting as pumping elements during relative rotation of the discs to cause radial outward flow of liquid through the grooves and through the passages back to the inner ends of the grooves in closed liquid circuits.

5. A rotary motion resisting device comprising a fixed housing formed with a cylindrical cavity, a hub in the housing rotatable relative thereto, a series of flat annular discs in the housing alternately secured in axially fixed relationship to the housing and the hub, radially extending straight grooves on the faces of the discs extending from the central portions to the peripheries thereof, and a liquid which will wet the surfaces of the discs filling the housing, the housing and hub being formed with passages connecting the inner and outer ends of the grooves and defining with the grooves substantially closed liquid circuits said grooves acting as pumping elements during relative rotation of the discs to cause radial outward flow of liquid through the grooves and through the passages back to the inner ends of the grooves in closed liquid circuits.

6. A rotary motion resisting device comprising a housing formed with a cylindrical cavity having flat ends, a hub in the housing rotatable relative thereto, a series of spaced flat annular discs in the housing alternately secured to the housing and the hub, the discs secured to the hub being spaced at their outer edges from the housing and the discs secured to the housing being spaced at their inner edges from the hub to leave fluid passages therearound, grooves on the faces of the discs and the housing ends lying at angles to radii therethrough with the grooves on adjacent faces crossing each other and the grooves on opposite faces of each disc angling in opposite directions, and a liquid which will wet the faces filling the housing to transmit torque between the discs.

7. A rotary motion resisting device comprising a housing formed with a cylindrical cavity having flat ends, a hub in the housing rotatable relative thereto, a series of flat annular discs in the housing alternately secured to the housing and the hub, the discs secured to the hub being spaced at their outer edges from the housing and the discs secured to the housing being spaced at their inner edges from the hub to leave fluid passages therearound, grooves on the faces of the discs and the housing ends lying at angles to radii therethrough with the grooves on adjacent faces crossing each other and the grooves on opposite faces of each disc angling in opposite directions, and a liquid which will wet the faces filling the housing, the housing and hub being formed with passages connecting the end faces of the housing cavity.

8. A rotary motion resisting device comprising two sets of annular discs having central open portions arranged in axially fixed spaced face to face relationship, means interconnecting the discs of one set to prevent relative rotation therebetween, means interconnecting the discs of the other set to prevent relative rotation therebetween and for rotation relative to the discs of said first named set, grooves on the faces of the discs extending continuously from the central open portions to the peripheries thereof, a housing defining an annular cavity in which the discs fit, and a liquid which will wet the surfaces of the discs filling the housing and the spaces between the discs, the housing being formed with passages which cooperate with the grooves and the spaces between the discs to define closed liquid circuits, said grooves acting as pumping elements during relative rotation of the discs to cause radial flow of liquid through the grooves and through the passages in the closed liquid circuits.

References Cited in the file of this patent

UNITED STATES PATENTS

| | | |
|---|---|---|
| 669,568 | Webb | Mar. 12, 1901 |
| 986,324 | Sutherland et al. | Mar. 7, 1911 |
| 1,238,447 | Severy | Aug. 28, 1917 |
| 2,079,724 | Van Ranst | May 11, 1937 |
| 2,189,189 | Bennett | Feb. 6, 1940 |
| 2,202,137 | Brown | May 28, 1940 |
| 2,507,182 | Young | May 9, 1950 |

FOREIGN PATENTS

| | | |
|---|---|---|
| 348,386 | France | Apr. 11, 1905 |
| 753,956 | France | Oct. 28, 1933 |
| 767,772 | France | July 24, 1934 |
| 976,917 | France | Nov. 1, 1950 |
| 254,458 | Switzerland | Dec. 16, 1948 |